P. DAIMLER.
STEERABLE FRONT WHEEL OF MOTOR DRIVEN VEHICLES.
APPLICATION FILED OCT. 25, 1906.
980,211.  Patented Jan. 3, 1911.
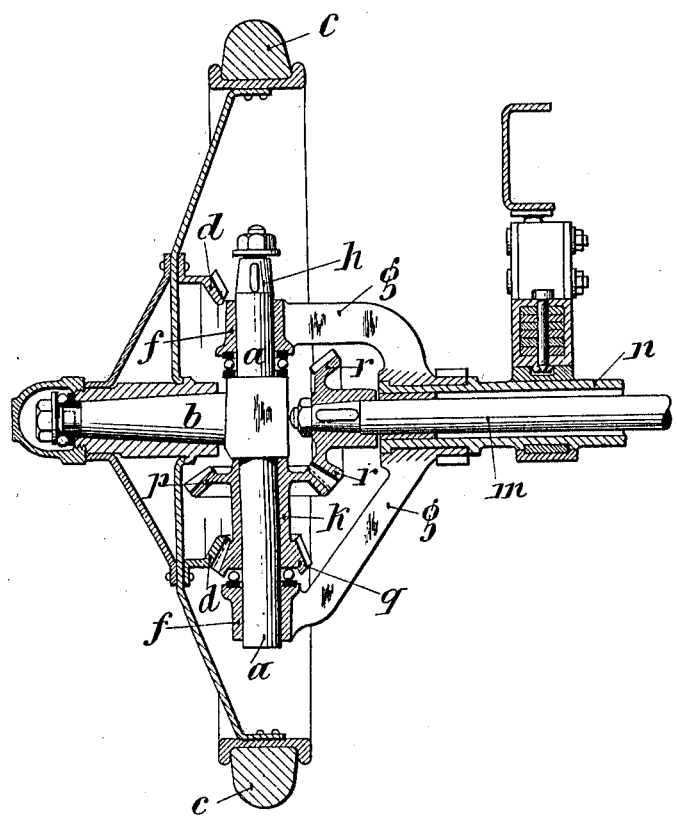

UNITED STATES PATENT OFFICE.

PAUL DAIMLER, OF UNTERTÜRKHEIM, GERMANY.

STEERABLE FRONT WHEEL OF MOTOR-DRIVEN VEHICLES.

980,211. Specification of Letters Patent. Patented Jan. 3, 1911.

Application filed October 25, 1906. Serial No. 340,547.

*To all whom it may concern:*

Be it known that I, PAUL DAIMLER, citizen of the Empire of Germany, residing at Untertürkheim, in the Kingdom of Würtemberg, Germany, have invented certain new and useful Improvements in Steerable Front Wheels of Motor-Driven Vehicles, of which the following is a specification, reference being had therein to the accompanying drawing.

This invention relates to a new kind of driving gear for steerable front wheels with which known means are partly used and whereby the steering of the wheels is greatly simplified and at the same time the speed may be varied within a wide limit.

According to my invention I attain the said object by combining the device in itself known consisting of a wheel axle pivot situated in or near the symmetric plane of the wheel with the device principally known consisting of a front wheel having internally a bevel wheel driven by a bevel pinion on the wheel axle pivot.

According to my invention I so modify this principally known method of driving the front wheels, that not only the bevel pinion which gears with the bevel wheel on the front wheel and is on a sleeve but also the bevel wheel in gear with the driving shaft is loosely mounted upon the part of the wheel axle pivot below the wheel axle but above the bottom wheel axle pivot bearing. By the said device the wheel axle pivot and sleeve thereon are mounted uncommonly rigid and secure owing to the moment of rotary reaction resulting from driving the front wheel from below the wheel axle acting upon the latter, being reduced to the difference of the moment of reaction of the force of the ground and that of the tooth pressure while compared with those devices where the driving wheel is situated above the wheel axle, the amount of the moment of rotary reaction on the wheel axle equals the sum of the said two moments. By the combination of this moment of rotary reaction with the device described, that is to say, the employment of the wheel axle pivot in or near the symmetric plane of the wheel, the steering is rendered uncommonly easy.

By combining the described manner of driving with a wheel axle pivot employed in the vertical symmetric plane of the wheel, a further advantage is obtained, namely, that the wheel will not be affected by any force liable to bring the teeth of the driving wheel out of gear with those of the front wheel; while in cases where the wheel axle pivot is situated outside the symmetric plane of the wheel, the wheel has a tendency to turn around an axis outside that of the wheel axle pivot which must necessarily produce forces which bring the two wheels out of gear.

The employment of the two toothed wheels below the wheel axle gives also a certain liberty in the choice of the speed variations, as the tooth wheel in gear with the wheel on the front wheel can be raised or lowered without having to alter the normal construction of the vehicle in any way.

Annexed drawing represents a vertical section of a vehicle wheel provided with my improved driving device.

To each end of the tube *n* which incloses the front wheel shaft *m* are secured two bearings *f*, *f*, situated above each other and carried by the fork like support *g*, *g*. In these bearings the vertical wheel axle pivots *a* are non-slidably mounted and at *h* adapted to receive the steering arm, the wheel axle *b* and the pivot *a* being formed in one part.

The bevel wheel inside the wheel *c* projects from the hub inwardly so that the wheel axle pivot *a* is situated as usual in the largest vertical diameter of the wheel *c*.

On the part of the wheel axle pivot *a* below the wheel axle *b* and above the bottom bearing *f* is a sleeve *k* having two bevel wheels *p*, *q*, *p* of which is in gear with the bevel wheel *r* on the driving shaft *m* and *q* with a wheel *d* arranged on the inner side of the wheel *c*.

I claim:

In a front wheel driving and steering gear, a driving shaft, a front wheel axle in alinement with the said driving shaft and having a vertical pivot, a sleeve loosely mounted on said wheel axle pivot below said
5 wheel axle, two bevel wheels keyed on the said sleeve, a bevel wheel on the inside of the said front wheel in gear with the lower and a bevel wheel secured upon the said driving shaft in gear with the upper of the said sleeve wheels, all combined substantially as 10 and for the purpose set forth.

In testimony whereof I hereunto affix my signature in presence of two witnesses.

PAUL DAIMLER.

Witnesses:
ROBERT UHLAND,
ERNST ENTENMANN.